(12) United States Patent
Yoshimura et al.

(10) Patent No.: US 11,911,725 B2
(45) Date of Patent: Feb. 27, 2024

(54) SEPARATION MEMBRANE

(71) Applicant: NITTO DENKO CORPORATION, Ibaraki (JP)

(72) Inventors: Kazuya Yoshimura, Ibaraki (JP); Daiki Iwasaki, Ibaraki (JP); Naomichi Kimura, Ibaraki (JP); Shinya Nishiyama, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 148 days.

(21) Appl. No.: 17/598,437

(22) PCT Filed: Mar. 12, 2020

(86) PCT No.: PCT/JP2020/010898
§ 371 (c)(1),
(2) Date: Sep. 27, 2021

(87) PCT Pub. No.: WO2020/195911
PCT Pub. Date: Oct. 1, 2020

(65) Prior Publication Data
US 2022/0161185 A1    May 26, 2022

(30) Foreign Application Priority Data
Mar. 26, 2019    (JP) .................. 2019-058741

(51) Int. Cl.
*B01D 53/22*    (2006.01)
*B01D 69/14*    (2006.01)
(Continued)

(52) U.S. Cl.
CPC ....... *B01D 53/228* (2013.01); *B01D 69/1218* (2022.08); *B01D 69/148* (2013.01);
(Continued)

(58) Field of Classification Search
None
See application file for complete search history.

(56) References Cited

U.S. PATENT DOCUMENTS

2007/0248523 A1* 10/2007 Duesberg .................. C09C 1/44
977/932
2009/0272692 A1* 11/2009 Kurth .................... B01D 69/148
210/652
(Continued)

FOREIGN PATENT DOCUMENTS

JP    2008-535648 A    9/2008
JP    2010-222228    * 10/2010 ............. B01D 53/22
(Continued)

OTHER PUBLICATIONS

Park, Eun Ji et al., "Assembly of PDMS/SiO2-PTFE and activated carbon fibre as a liquid water-resistant gas sorbent structure", Chemical Engineering Journal, 325, 2017, pp. 433-441 (Year: 2017).*

(Continued)

*Primary Examiner* — Jason M Greene
(74) *Attorney, Agent, or Firm* — HAUPTMAN HAM, LLP

(57) ABSTRACT

The present invention provides a separation membrane that is suitable for separating an acid gas from a gas mixture containing the acid gas and has a high acid gas permeability. A separation membrane (10) of the present invention includes: a separation functional layer (1); a porous support member (3) supporting the separation functional layer (1); and an intermediate layer (2) disposed between the separation functional layer (1) and the porous support member (3), and including a matrix (4) and nanoparticles (5) dispersed in the matrix (4).

8 Claims, 9 Drawing Sheets

(51) Int. Cl.
  *B01D 71/02* (2006.01)
  *B01D 71/70* (2006.01)
  *B01D 71/52* (2006.01)
  *B01D 69/12* (2006.01)
  *B82Y 30/00* (2011.01)
(52) U.S. Cl.
  CPC ...... *B01D 69/14111* (2022.08); *B01D 71/021* (2013.01); *B01D 71/027* (2013.01); *B01D 71/5211* (2022.08); *B01D 71/5222* (2022.08); *B01D 71/701* (2022.08); *B01D 2257/504* (2013.01); *B82Y 30/00* (2013.01)

(56) References Cited

U.S. PATENT DOCUMENTS

| | | | | |
|---|---|---|---|---|
| 2012/0241371 | A1* | 9/2012 | Revanur | B01D 69/148 210/488 |
| 2013/0131200 | A1* | 5/2013 | Huang | B01D 67/0079 521/27 |
| 2016/0354731 | A1 | 12/2016 | Mochizuki | |
| 2019/0030482 | A1* | 1/2019 | Ding | B01D 53/228 |
| 2019/0091635 | A1 | 3/2019 | Mukai et al. | |
| 2019/0184345 | A1 | 6/2019 | Kawakami et al. | |
| 2019/0314768 | A1 | 10/2019 | Kimura et al. | |
| 2020/0094195 | A1 | 3/2020 | Nakamura et al. | |

FOREIGN PATENT DOCUMENTS

| | | | |
|---|---|---|---|
| JP | 2010-222228 A | 10/2010 | |
| JP | 2015-160159 A | 9/2015 | |
| JP | 2016-77997 | * 5/2016 | ............ B01D 69/00 |
| JP | 2016-77997 A | 5/2016 | |
| JP | 2018-83193 A | 5/2018 | |
| WO | 2006/098872 A2 | 9/2006 | |
| WO | 2017/201482 A1 | 11/2017 | |
| WO | 2018/030114 A1 | 2/2018 | |
| WO | 2018/038027 A1 | 3/2018 | |
| WO | 2018/084264 A1 | 5/2018 | |
| WO | 2018/211944 A1 | 11/2018 | |

OTHER PUBLICATIONS

Extended European Search Report dated Nov. 23, 2022, for corresponding European Patent Application No. 20777257.5 (9 pages).
Haesook Kim et al., "PDMS-silica composite membranes with silane coupling for propylene separation", Journal of Membrane Science, Nov. 1, 2009, vol. 344, No. 1-2, pp. 211-218.
Eun Ji Park et al., "Assembly of PDMS/SiO2-PTFE and activated carbon fibre as a liquid water-resistant gas sorbent structure", Chemical Engineering Journal, May 15, 2017, vol. 325, pp. 433-441.
International Search Report issued for corresponding International Patent Application No. PCT/JP2020/010898 dated Jun. 2, 2020, along with an English translation.
Written Opinion issued for corresponding International Patent Application No. PCT/JP2020/010898 dated Jun. 2, 2020, along with an English translation.
Eiji Kamio et al., "Inorganic/Organic Double-Network Gels Containing Ionic Liquids", Advanced Materials, 2017, vol. 29, 1704118.

* cited by examiner

SEPARATION MEMBRANE

CROSS REFERENCE TO RELATED APPLICATION

This application is a National Stage of International Application No. PCT/JP2020/010898, filed on Mar. 12, 2020, which designates the United States and was published in Japan, and which is based upon and claims priority to Japanese Patent Application No. 2019-058741 filed on Mar. 26, 2019 in the Japan Patent Office. All of the aforementioned applications are hereby incorporated by reference in their entireties.

TECHNICAL FIELD

The present invention relates to a separation membrane suitable for separating an acid gas from a gas mixture containing the acid gas.

BACKGROUND ART

A membrane separation method has been developed as a method for separating an acid gas such as carbon dioxide from a gas mixture containing the acid gas. The membrane separation method allows an efficient separation of an acid gas with a suppressed operation cost, compared with an absorption method according to which an acid gas contained in a gas mixture is absorbed by an absorbent to be separated.

Separation membranes used in the membrane separation method include a composite membrane in which a separation functional layer is formed on a porous support member. Reduction in membrane thickness of the separation functional layer of the composite membrane increases an acid gas permeation rate. To further reduce the membrane thickness of the separation functional layer, an intermediate layer may be disposed between the separation functional layer and the porous support member (for example, Patent Literature 1).

CITATION LIST

Patent Literature

Patent Literature 1: JP 2015-160159 A

SUMMARY OF INVENTION

Technical Problem

Separation membranes for separating an acid gas are required to further improve the acid gas permeation rate without deteriorating acid gas separation performance.

In view of this, the present invention aims to provide a separation membrane that is suitable for separating an acid gas from a gas mixture containing the acid gas and exhibits a high acid gas permeation rate.

Solution to Problem

The present invention provides a separation membrane including:
a separation functional layer;
a porous support member supporting the separation functional layer; and
an intermediate layer disposed between the separation functional layer and the porous support member, and including a matrix and nanoparticles dispersed in the matrix.

The present invention further provides a separation membrane including a layer including a matrix and nanoparticles dispersed in the matrix, the layer having a thickness of less than 50 μm.

Advantageous Effects of Invention

According to the present invention, it is possible to provide a separation membrane that is suitable for separating an acid gas from a gas mixture containing the acid gas and exhibits a high acid gas permeation rate.

DESCRIPTION OF EMBODIMENTS

In one embodiment of the present invention, the nanoparticle has a surface modified with a modifying group including a carbon atom.

In one embodiment of the present invention, the modifying group further includes a silicon atom.

In one embodiment of the present invention, the modifying group includes an optionally substituted hydrocarbon group.

In one embodiment of the present invention, the hydrocarbon group is a linear or branched alkyl group having 1 to 8 carbon atoms.

In one embodiment of the present invention, the optionally substituted hydrocarbon group is represented by formula (1) below:

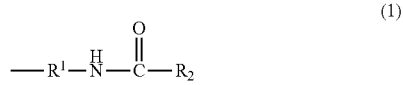

where $R^1$ is an optionally substituted alkylene group having 1 to 5 carbon atoms, and $R^2$ is an optionally substituted alkyl group or aryl group having 1 to 20 carbon atoms.

In one embodiment of the present invention, the nanoparticle includes silica.

In one embodiment of the present invention, the matrix includes a silicone resin.

In one embodiment of the present invention, the intermediate layer has a thickness of 30 μm or less.

In one embodiment of the present invention, the separation functional layer includes a polyether block amide resin.

In one embodiment of the present invention, the separation functional layer includes an ionic liquid.

In one embodiment of the present invention, the separation functional layer has a double-network gel including the ionic liquid.

The present invention will be described in detail below. The following description is not intended to limit the present invention to a specific embodiment.

<Embodiment of Separation Membrane>

Figure 1:
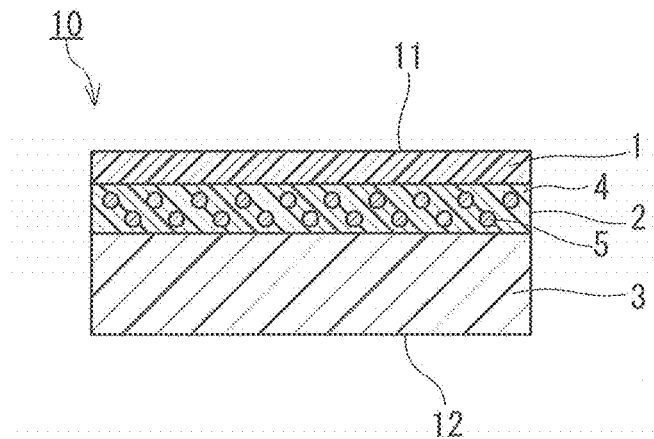
FIG. 1 is a cross-sectional view of a separation membrane according to an embodiment of the present invention.

As shown in FIG. 1, a separation membrane 10 of the present embodiment includes a separation functional layer 1, an intermediate layer 2, and a porous support member 3. The intermediate layer 2 is disposed between the separation functional layer 1 and the porous support member 3, and is in direct contact with each of the separation functional layer 1 and the porous support member 3.

The intermediate layer 2 includes a matrix 4 and nanoparticles 5. The nanoparticles 5 are dispersed in the matrix 4 and embedded in the matrix 4. In the embodiment shown in FIG. 1, all the nanoparticles 5 are separated from each other. However, the nanoparticles 5 may partially aggregate.

(Separation Functional Layer)

The separation functional layer 1 is a layer allowing an acid gas contained in a gas mixture to preferentially permeate therethrough. In a preferred embodiment of the present invention, the separation functional layer 1 includes a resin. Examples of the resin included in the separation functional layer 1 include a polyether block amide resin, a polyamide resin, a polyether resin, a polyimide resin, a cellulose acetate resin, a silicone resin, and a fluorine resin. The separation functional layer 1 preferably includes a polyether block amide resin. In this embodiment, the separation functional layer 1 is preferably composed substantially of a resin. In the present description, the phrase "composed substantially of" means exclusion of other component that alters essential characteristics of a material referred to, and for example means that 95% or more or even 99% or more is composed of the material.

In another preferred embodiment of the present invention, the separation functional layer 1 includes an ionic liquid. The separation functional layer 1 includes for example a double-network gel including an ionic liquid. The double-network gel is a gel including two types of network structures independent from each other. The double-network gel includes for example a first network structure composed mainly of an organic material, a second network structure composed mainly of an inorganic material, and an ionic liquid. In the present specification, the phrase "composed mainly of" means that 50 wt % or more or even 70 wt % or more is composed of the material. The organic material for constituting the first network structure includes for example a polymer such as polyacrylamide (particularly, polydialkylamide such as polydimethylacrylamide). The second network structure may include a network of a plurality of particles. The network of the plurality of particles are formed by for example the plurality of particles being bonded to each other by hydrogen bonds. The particles included in the second network structure may be particles exemplified as the nanoparticles 5 described later. As an example, the particles included in the second network structure are silica particles.

In the present embodiment, specific examples of the ionic liquid include an ionic liquid having; imidazolium, pyridinium, ammonium, or phosphonium; and a substituent having 1 or more carbon atoms.

In an ionic liquid having imidazolium and a substituent having 1 or more carbon atoms, examples of the substituent having 1 or more carbon atoms include an alkyl group having 1 to 20 carbon atoms, a cycloalkyl group having 3 to 14 carbon atoms, and an aryl group having 6 to 20 carbon atoms, and these may be each further substituted by a hydroxy group, a cyano group, an amino group, a monovalent ether group, or the like (for example, a hydroxyalkyl group having 1 to 20 carbon atoms).

Examples of the alkyl group having 1 to 20 carbon atoms include a methyl group, an ethyl group, an n-propyl group, an n-butyl group, an n-pentyl group, an n-hexyl group, an n-heptyl group, an n-octyl group, an n-nonyl group, an n-decyl group, an n-undecyl group, an n-dodecyl group, an n-tridecyl group, an n-tetradecyl group, an n-pentadecyl group, an n-hexadecyl group, an n-heptadecyl group, an n-octadecyl group, an n-nonadecyl group, an n-eicosadecyl group, an i-propyl group, a sec-butyl group, an i-butyl group, a 1-methylbutyl group, a 1-ethylpropyl group, a 2-methylbutyl group, an i-pentyl group, a neopentyl group, a 1,2-dimethylpropyl group, a 1,1-dimethylpropyl group, a t-pentyl group, a 2-ethylhexyl group, and a 1,5-dimethylhexyl group. These may be each further substituted by a hydroxy group, a cyano group, an amino group, a monovalent ether group, or the like.

The above alkyl group may be substituted by a cycloalkyl group. The number of carbon atoms in the alkyl group substituted by the cycloalkyl group is for example 1 or more and 20 or less. Examples of the alkyl group substituted by the cycloalkyl group include a cyclopropyl methyl group, a cyclobutyl methyl group, a cyclohexyl methyl group, and a cyclohexyl propyl group. These may be each further substituted by a hydroxy group, a cyano group, an amino group, a monovalent ether group, or the like.

Examples of the cycloalkyl group having 3 to 14 carbon atoms include a cyclopropyl group, a cyclobutyl group, a cyclopentyl group, a cyclohexyl group, a cycloheptyl group, a cyclooctyl group, a cyclododecyl group, a norbornyl group, a bornyl group, and an adamantyl group. These may be each further substituted by a hydroxy group, a cyano group, an amino group, a monovalent ether group, or the like.

Examples of the aryl group having 6 to 20 carbon atoms include a phenyl group, a toluyl group, a xylyl group, a mesityl group, an anisyl group, a naphthyl group, and a benzyl group. These may be each further substituted by a hydroxy group, a cyano group, an amino group, a monovalent ether group, or the like.

A compound having imidazolium and a substituent having 1 or more carbon atoms may further have a substituent such as an alkyl group, and may form a salt with a counter anion. Examples of the counter anion include alkyl sulfate, tosylate, methanesulfonate, acetate, bis(fluorosulfonyl)imide, bis(trifluoromethanesulfonyl)imide, thiocyanate, dicyanamide, tricyanomethanide, tetracyanoborate, hexafluorophosphate, tetrafluoroborate, and halide. From the viewpoint of gas separation performance, preferred are bis(fluorosulfonyl)imide, bis(trifluoromethanesulfonyl)imide, dicyanamide, tricyanomethanide, and tetracyanoborate.

Specific examples of the ionic liquid having imidazolium and a substituent having 1 or more carbon atoms include 1-ethyl-3-methylimidazolium bis(fluorosulfonyl)imide, 1-ethyl-3-methylimidazolium dicyanamide, 1-butyl-3-methylimidazolium bromide, 1-butyl-3-methylimidazolium chloride, 1-butyl-3-methylimidazolium tetrafluoroborate, 1-butyl-3-methylimidazolium hexafluorophosphate, 1-butyl-3-methylimidazolium trifluoromethanesulfonate, 1-butyl-3-methylimidazolium tetrachloroferrate, 1-butyl-3-methylimidazolium iodide, 1-butyl-2,3-dimethylimidazolium chloride, 1-butyl-2,3-dimethylimidazolium hexafluorophosphate, 1-butyl-2,3-dimethylimidazolium tetrafluoroborate, 1-butyl-3-methylimidazolium bis(trifluoromethanesulfonyl)imide, 1-butyl-2,3-dimethylimidazolium bis(trifluoromethanesulfonyl)imide, 1-butyl-2,3-dimethylimidazolium bis(trifluoromethanesulfonyl)imide, 1-butyl-3-methylimidazolium trifluoro(trifluoromethyl)borate, 1-butyl-3-methylimidazolium tribromide, 1,3-dimesitylimidazolium chloride, 1,3-bis(2,6-diisopropylphenyl)imidazolium chloride, 1,3-diisopropylimidazolium tetrafluoroborate, 1,3-di-tert-butylimidazolium tetrafluoroborate, 1,3-dicyclohexylimidazolium tetrafluoroborate, 1,3-dicyclohexylimidazolium chloride, 1,2-dimethyl-3-propylimidazolium iodide, 1-hexyl-3-methylimidazolium chloride, 1-hexyl-3-methylimidazolium hexafluorophosphate, 1-hexyl-3-methylimidazolium tetrafluoroborate, 1-hexyl-3-methylimidazolium bromide, 1-methyl-3-propylimidazolium iodide, 1-methyl-3-n-octylimidazolium bromide, 1-methyl-3-n-octylimidazolium chloride, 1-methyl-3-n-octylimidazolium hexafluorophosphate, 1-methyl-3-[6-(methylsulfinyl)hexyl]imidazolium p-toluenesulfonate, 1-ethyl-3-methylimidazolium tricyanomethanide, 1-ethyl-3-methylimidazolium tetracyanoborate, and 1-(2-hydroxyethyl)-3-methylimidazolium bis(trifluoromethanesulfonyl)imide.

Among these, from the viewpoint of gas separation performance, particularly preferred are 1-ethyl-3-methylimidazolium bis(fluorosulfonyl)imide ([Emim][FSI]), 1-ethyl-3-methylimidazolium dicyanamide ([Emim][DCA]), 1-ethyl-3-methylimidazolium tricyanomethanide ([Emim][TCM]), 1-ethyl-3-methylimidazolium tetracyanoborate ([Emim][TCB]), 1-butyl-3-methylimidazolium bis(trifluoromethanesulfonyl)imide ([C$_4$mim][TF$_2$N]), and 1-(2-hydroxyethyl)-3-methylimidazolium bis(trifluoromethanesulfonyl)imide ([C$_2$OHim][TF$_2$N]).

The method for producing the double-network gel is not particularly limited, and for example, the method disclosed in E. Kamio et al., Adv. Mater., 29, 1704118 (2017) can be used.

The content of the ionic liquid in the double-network gel is for example 50 wt % or more, preferably 60 wt % or more, more preferably 70 wt % or more, and still more preferably 80 wt % or more. The higher the content of the ionic liquid is, the more preferentially the separation functional layer 1 can allow the acid gas contained in the gas mixture to permeate therethrough. The upper limit of the content of the ionic liquid is not particularly limited, and is for example 95 wt %.

The content of the first network structure composed mainly of an organic material in the double-network gel is for example 1 wt % or more, preferably 5 wt % or more, and more preferably 10 wt % or more. The upper limit of the content of the first network structure is for example 15 wt %. The content of the second network structure composed mainly of an inorganic material in the double-network gel is for example 1 wt % or more, from the viewpoint of improving the strength of the double-network gel. The upper limit of the content of the second network structure is for example 5 wt %. The ratio of the total value of the weight of the first network structure and the weight of the second network structure to the weight of the double-network gel is for example 2 wt % or more, preferably 5 wt % or more, and more preferably 10 wt % or more. This ratio is preferably 20 wt % or less. In this embodiment, the separation functional layer 1 is preferably composed substantially of the double-network gel.

The thickness of the separation functional layer 1 is for example 50 μm or less, preferably 25 μm or less, and more preferably 15 μm or less. In some cases, the thickness of the separation functional layer 1 may be 10 μm or less, 5.0 μm or less, or 2.0 μm or less. The thickness of the separation functional layer 1 may be 0.05 μm or more, or 0.1 μm or more.

(Intermediate Layer)

As described above, the intermediate layer 2 includes the matrix 4 and the nanoparticles 5. The material of the matrix 4 is not particularly limited, and examples thereof include a silicone resin such as polydimethylsiloxane; a fluorine resin such as polytetrafluoroethylene; an epoxy resin such as polyethylene oxide; a polyimide resin; a polysulfone resin; a polyacetylene resin such as polytrimethylsilylpropyne and polydiphenylacetylene; and a polyolefin resin such as polymethylpentene. The matrix 4 preferably includes a silicone resin.

The nanoparticle 5 may include an inorganic material. The nanoparticle 5 may include an organic material. The inorganic material included in the nanoparticle 5 is for example silica, titania, or alumina. The nanoparticle 5 preferably includes silica.

The nanoparticle 5 may have a surface modified with a modifying group including a carbon atom. The nanoparticle 5 having the surface modified with the modifying group exhibits an excellent dispersibility in the matrix 4. The nanoparticle 5 is for example a silica nanoparticle that may have a surface modified with a modifying group. The modifying group further includes a silicon atom, for example. The surface modified with the modifying group in the nanoparticle 5 is represented by formulae (2) to (4) below, for example.

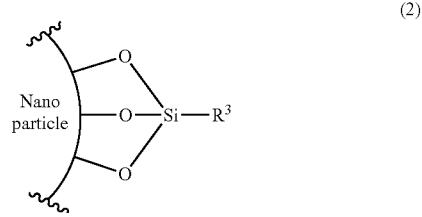

(2)

-continued

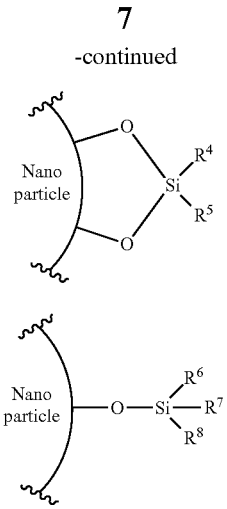

(3)

(4)

In the formulae (2) to (4), $R^3$ to $R^8$ are each independently and an optionally substituted hydrocarbon group. The number of carbon atoms in the hydrocarbon group only needs to be one or more and is not particularly limited. The number of carbon atoms in the hydrocarbon group may be for example 25 or less, 20 or less, 10 or less, or 5 or less. In some cases, the number of carbon atoms in the hydrocarbon group may be greater than 25. The hydrocarbon group may be a linear or branched chain hydrocarbon group, or may be an alicyclic or aromatic cyclic hydrocarbon group. In a preferred embodiment of the present invention, the hydrocarbon group is a linear or branched alkyl group having 1 to 8 carbon atoms. The hydrocarbon group is for example a methyl group or an octyl group, and is preferably a methyl group. The substituent in the hydrocarbon group is for example an amino group or an acyloxy group. The acyloxy group is for example a (meth)acryloyloxy group.

In another preferred embodiment of the present invention, the optionally substituted hydrocarbon group described above for $R^3$ to $R^8$ of the formulae (2) to (4) is represented by formula (1) below. The nanoparticle 5 having a surface modified with a modifying group including the hydrocarbon group represented by the formula (1) is suitable for improving an acid gas permeation rate through the separation membrane 10.

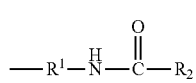

(1)

In the formula (1), $R^1$ is an optionally substituted alkylene group having 1 to 5 carbon atoms. The alkylene group may be linear or branched. The alkylene group is for example a methylene group, an ethylene group, a propane-1,3-diyl group, a butane-1,4-diyl group, or a pentane-1,5-diyl group, and is preferably a propane-1,3-diyl group. The substituent in the alkylene group is an amide group, an aminoalkylene group, or the like.

In the formula (1), $R^2$ is an optionally substituted alkyl group or aryl group having 1 to 20 carbon atoms. The alkyl group may be linear or branched. Examples of the alkyl group and the aryl group include those described above for the ionic liquid. Examples of the substituents in the alkyl group and the aryl group include an amino group and a carboxyl group, and $R^2$ is for example a 3,5-diaminophenyl group.

The surface modified with the modifying group in the nanoparticle 5 is preferably represented by formula (5) below.

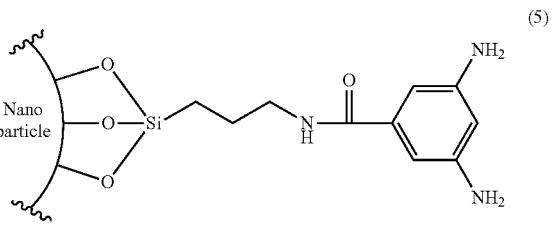

(5)

The modifying group is not limited to have the structures shown in the formulae (2) to (4). The modifying group may include a polymer chain having a polyamide structure or a polydimethylsiloxane structure instead of $R^3$ to $R^8$ in the formulae (2) to (4). In the modifying group, for example, this polymer chain is directly bonded to a silicon atom. Examples of the shape of this polymer chain include linear, dendrimer and hyper-branched shapes.

The method for modifying the surface of the nanoparticle 5 with a modifying group is not particularly limited. For example, the surface of the nanoparticle 5 can be modified by reacting a hydroxyl group present on the surface of the nanoparticle 5 with a known silane coupling agent. In the case where the modifying group includes a polyamide structure, the surface of the nanoparticle 5 can be modified by, for example, the method disclosed in JP 2010-222228 A.

The average particle diameter of the nanoparticles 5 is not particularly limited as long as it is on the order of nanometers (<1000 nm), and is for example 100 nm or less, preferably 50 nm or less, and more preferably 20 nm or less. The lower limit of the average particle diameter of the nanoparticles 5 is for example 1 nm. The average particle diameter of the nanoparticles 5 can be specified by the following method, for example. First, a cross section of the intermediate layer 2 is observed with a transmission electron microscope. In the obtained electron microscope image, the area of a specific nanoparticle 5 is calculated by image processing. The diameter of a circle having the same area as the calculated area is regarded as the particle diameter (diameter of the particle) of the specific nanoparticle 5. The particle diameter of each of an arbitrary number (at least 50) of nanoparticles 5 is calculated, and the average value of the calculated values is regarded as the average particle diameter of the nanoparticles 5. The nanoparticles 5 are not limited to have any particular shape, and may be spherical, ellipsoidal, flaky, or fibrous.

The content of the nanoparticles 5 in the intermediate layer 2 is for example 5 wt % or more, preferably 10 wt % or more, and more preferably 15 wt % or more. The upper limit of the content of the nanoparticles 5 in the intermediate layer 2 is not particularly limited, and is for example 30 wt %.

The thickness of the intermediate layer 2 is not particularly limited, and is for example less than 50 μm, preferably 40 μm or less, and more preferably 30 μm or less. The lower limit of the thickness of the intermediate layer 2 is not particularly limited, and is for example 1 μm. The intermediate layer 2 is for example a layer having a thickness of less than 50 μm.

(Porous Support Member)

The porous support member 3 supports the separation functional layer 1 via the intermediate layer 2. Examples of the porous support member 3 include: a nonwoven fabric; porous polytetrafluoroethylene; aromatic polyamide fiber; a porous metal; a sintered metal; porous ceramic; porous polyester; porous nylon; activated carbon fiber; latex; silicone; silicone rubber; a permeable (porous) polymer including at least one selected from the group consisting of polyvinyl fluoride, polyvinylidene fluoride, polyurethane, polypropylene, polyethylene, polystyrene, polycarbonate, polysulfone, polyether ether ketone, polyacrylonitrile, polyimide, and polyphenylene oxide; a metallic foam having an open cell or a closed cell; a polymer foam having an open cell or a closed cell; silica; a porous glass; and a mesh screen. The porous support member 3 may be a combination of two or more of these materials.

The porous support member 3 has an average pore diameter of 0.01 to 0.4 µm, for example. The thickness of the porous support member 3 is not particularly limited, and is for example 10 µm or more, preferably 20 µm or more, and more preferably 50 µm or more. The thickness of the porous support member 3 is for example 300 µm or less, preferably 200 µm or less, and more preferably 150 µm or less.

(Method for Producing Separation Membrane)

The separation membrane 10 can be produced by the following method, for example. First, a coating liquid containing a material (a resin or a double-network gel) of the separation functional layer 1 is prepared. Next, the coating liquid is applied onto a transfer film to obtain a coating. The material of the transfer film is for example polyethylene terephthalate (PET). The method for applying the coating liquid is not particularly limited, and a spin coating method can be used, for example. The thickness of the separation functional layer 1 which is to be formed from the coating can be adjusted by adjusting the rotational speed of a spin coater, the concentration of the material of the separation functional layer 1 in the coating liquid, etc. Next, the coating is dried to form the separation functional layer 1. The coating can be dried under heating conditions, for example. The heating temperature of the coating is for example 50° C. or more. The heating time of the coating is for example five minutes or more.

Next, a dispersion containing the material of the matrix 4 and the nanoparticles 5 is prepared. The dispersion is applied onto the separation functional layer 1 to obtain a coating. The coating is dried to form the intermediate layer 2. The method for applying the dispersion and drying conditions for the coating can be the same as the method and the conditions described above for the separation functional layer 1. Next, the porous support member 3 is attached to the intermediate layer 2, and the transfer film is removed, thereby obtaining the separation membrane 10.

The method for producing the separation membrane 10 is not limited to the above method. For example, the separation membrane 10 may be produced by the following method. First, a dispersion containing the material of the matrix 4 and the nanoparticles 5 is applied onto the porous support member 3 to obtain a coating. The method for applying the dispersion is not particularly limited, and a dip coating method can be used, for example. The coating is dried to form the intermediate layer 2. The drying conditions for the coating can be the same as the above conditions.

Next, a coating liquid containing the material of the separation functional layer 1 is applied onto the intermediate layer 2 to obtain a coating. The method for applying the coating liquid is not particularly limited, and the spin coating method can be used, for example. The coating is dried to form the separation functional layer 1. The drying conditions for the coating can be the same as the above conditions. Thus, the separation membrane 10 can be obtained.

In the case where the coating liquid containing the material of the separation functional layer 1 is directly applied to the porous support member 3, part of the material of the separation functional layer 1, together with the coating liquid, enters pores of the porous support member 3. Even in the case where the separation functional layer 1 that has been formed in advance is directly transferred onto the porous support member 3, part of the material of the separation functional layer 1 enters the pores of the porous support member 3. When part of the material of the separation functional layer 1 enters the pores of the porous support member 3, a portion of the porous support member 3 filled with the material of the separation functional layer 1 also functions as a separation functional layer. The material of the separation functional layer 1, which has entered the pores of the porous support member 3, infiltrates in the thickness direction of the porous support member 3. Accordingly, the concentration of the material of the separation functional layer 1 in the porous support member 3 gradually decreases from a surface of the porous support member 3 on which the separation functional layer 1 is disposed toward the thickness direction of the porous support member 3. When the material of the separation functional layer 1 infiltrates in the thickness direction of the porous support member 3, the apparent thickness of the separation functional layer 1 increases and the acid gas permeation rate decreases. Because of preventing the material of the separation functional layer 1 from entering the pores of the porous support member 3, the intermediate layer 2 is suitable for keeping the thickness of the separation functional layer 1 small.

(Characteristics of Separation Membrane)

According to the separation membrane 10 of the present embodiment, the intermediate layer 2 includes the nanoparticles 5. In the intermediate layer 2, an acid gas can easily move through the interface between the nanoparticles 5 and the matrix 4. Accordingly, the separation membrane 10 of the present embodiment can easily increase the acid gas permeation rate, compared with conventional separation membranes including an intermediate layer including no nanoparticles 5. As an example, a permeation rate T of carbon dioxide permeating through the separation membrane 10 is for example 20 GPU or more, and preferably 25 GPU or more. The upper limit of the permeation rate T is not particularly limited, and is for example 500 GPU. Here, GPU means $10^{-6} \cdot cm^3$ (STP)/(sec·$cm^2$·cmHg), and $cm^3$ (STP) means the volume of carbon dioxide at 1 atm and 0° C.

The permeation rate T can be calculated by the following method. First, to a space adjacent to one surface of the separation membrane 10 (for example, a main surface 11 on the separation functional layer side of the separation membrane 10), a gas mixture composed of carbon dioxide and helium is supplied. As a result, in a space adjacent to the other surface of the separation membrane 10 (for example, a main surface 12 on the porous support member side of the separation membrane 10), a permeated fluid that has permeated through the separation membrane 10 can be obtained. The weight of the permeated fluid and the volume ratio of carbon dioxide and the volume ratio of helium in the permeated fluid are measured. From the measurement results, the permeation rate T can be calculated. In the above operation, the concentration of carbon dioxide in the gas mixture is 0.5 vol % under standard conditions (0° C., 1 atm). The gas mixture supplied to the space adjacent to the one surface of the separation membrane 10 has a temperature of 30° C. and a pressure of 0.1 MPa.

Under the above measurement conditions for the permeation rate T, a separation factor α of the separation membrane 10 for carbon dioxide with respect to helium is for example 5 or more, preferably 10 or more, and more preferably 15 or more. The upper limit of the separation factor α is not particularly limited, and is for example 100. The separation factor α can be calculated from the following equation. It should be noted that, in the following formula, $X_A$ and $X_B$ are respectively a volume ratio of carbon dioxide and a volume ratio of helium in the gas mixture, and $Y_A$ and $Y_B$ are respectively the volume ratio of carbon dioxide and the volume ratio of helium in the permeated fluid that has permeated through the separation membrane 10.

$$\text{Separation factor } \alpha = (Y_A/Y_B)/(X_A/X_B)$$

Note that JP 2010-222228 A includes a description that a single-layer membrane including an inorganic nanoparticle having a surface modified with a polymer exhibits an excellent gas permeability. However, results of Example 5 and Comparative Example 2 of JP 2010-222228 A prove that addition of inorganic nanoparticles greatly deteriorates separation performance of the single-layer membrane with respect to an acid gas (carbon dioxide). Compared with this, the separation membrane 10 of the present embodiment is a composite membrane including the separation functional layer 1 and the intermediate layer 2, and accordingly can substantially maintain the separation factor α of the separation membrane 10 even with the nanoparticles 5 included in the intermediate layer 2. The separation membrane 10 of the present embodiment not only exhibits a high acid gas permeation rate but also has the separation factor α sufficient for practical use. By forming a membrane of the same type as the intermediate layer 2 to be thick, it is possible to obtain a separation membrane including only the membrane as a separation functional layer. However, as described above, since the separation membrane 10 of the present embodiment includes the separation functional layer 1, the thickness of the intermediate layer 2 can be adjusted to less than 50 μm.

(Embodiment of Membrane Separation Device)

Figure 2:
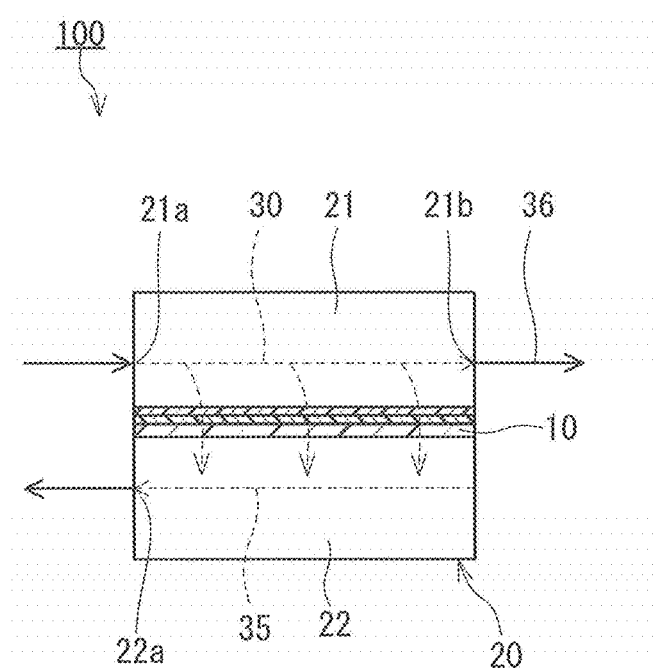
FIG. 2 is a schematic cross-sectional view of a membrane separation device including the separation membrane of the present invention.

As shown in FIG. 2, a membrane separation device 100 of the present embodiment includes the separation membrane 10 and a tank 20. The tank 20 includes a first chamber 21 and a second chamber 22. The separation membrane 10 is disposed in the tank 20. In the tank 20, the separation membrane 10 separates the first chamber 21 and the second chamber 22 from each other. The separation membrane 10 extends from one of a pair of wall surfaces of the tank 20 to the other.

The first chamber 21 has an inlet 21a and an outlet 21b. The second chamber 22 has an outlet 22a. The inlet 21a, the outlet 21b, and the outlet 22a are each for example an opening provided in the wall surfaces of the tank 20.

Membrane separation using the membrane separation device 100 is performed by the following method, for example. First, a gas mixture 30 containing an acid gas is supplied to the first chamber 21 via the inlet 21a. The acid gas in the gas mixture 30 is for example at least one selected from the group consisting of hydrogen sulfide, carbonyl sulfide, sulfur oxide (SOx), hydrogen cyanide, and nitrogen oxide (NOx), and more preferably at least one selected from the group consisting of carbon dioxide and hydrogen sulfide. The gas mixture 30 contains a gas other than the acid gas. Such another gas is for example a nonpolar gas such as hydrogen or nitrogen, or an inert gas such as helium. The concentration of the acid gas in the gas mixture 30 is not particularly limited, and is for example 0.01 vol % (100 ppm) or more, preferably 1 vol % or more, more preferably 10 vol % or more, still more preferably 30 vol % or more, and particularly preferably 50 vol % or more, under standard conditions. The upper limit of the concentration of the acid gas in the gas mixture 30 is not particularly limited, and is for example 90 vol % under standard conditions.

The pressure in the first chamber 21 may be increased by supplying the gas mixture 30. The membrane separation device 100 may further include a pump (not shown) for increasing the pressure of the gas mixture 30. The pressure of the gas mixture 30 to be supplied to the first chamber 21 is for example 0.1 MPa or more, and preferably 0.3 MPa or more.

The pressure in the second chamber 22 may be decreased while the gas mixture 30 is supplied to the first chamber 21. The membrane separation device 100 may further include a pump (not shown) for decreasing the pressure in the second chamber 22. The pressure in the second chamber 22 is decreased such that a space in the second chamber 22 has a pressure lower than an atmospheric pressure in a measurement environment by, for example, 10 kPa or more, preferably 50 kPa or more, and more preferably 100 kPa or more.

Supply of the gas mixture 30 to the first chamber 21 allows to obtain, on the other surface side of the separation membrane 10, a permeated fluid 35 having a content of an acid gas higher than the gas mixture 30. That is, the permeated fluid 35 is supplied to the second chamber 22. The permeated fluid 35 contains for example an acid gas as a main component. The permeated fluid 35 may contain a small amount of a gas other than the acid gas. The permeated fluid 35 is discharged outside the tank 20 via the outlet 22a.

The concentration of the acid gas in the gas mixture 30 gradually increases from the inlet 21a toward the outlet 21b in the first chamber 21. The gas mixture 30 processed in the first chamber 21 (concentrated fluid 36) is discharged outside the tank 20 via the outlet 21b.

The membrane separation device 100 of the present embodiment is suitable for a flow-type (continuous-type) membrane separation method. The membrane separation device 100 of the present embodiment may be used for a batch-type membrane separation method.

(Modification of Membrane Separation Device)

Figure 3:
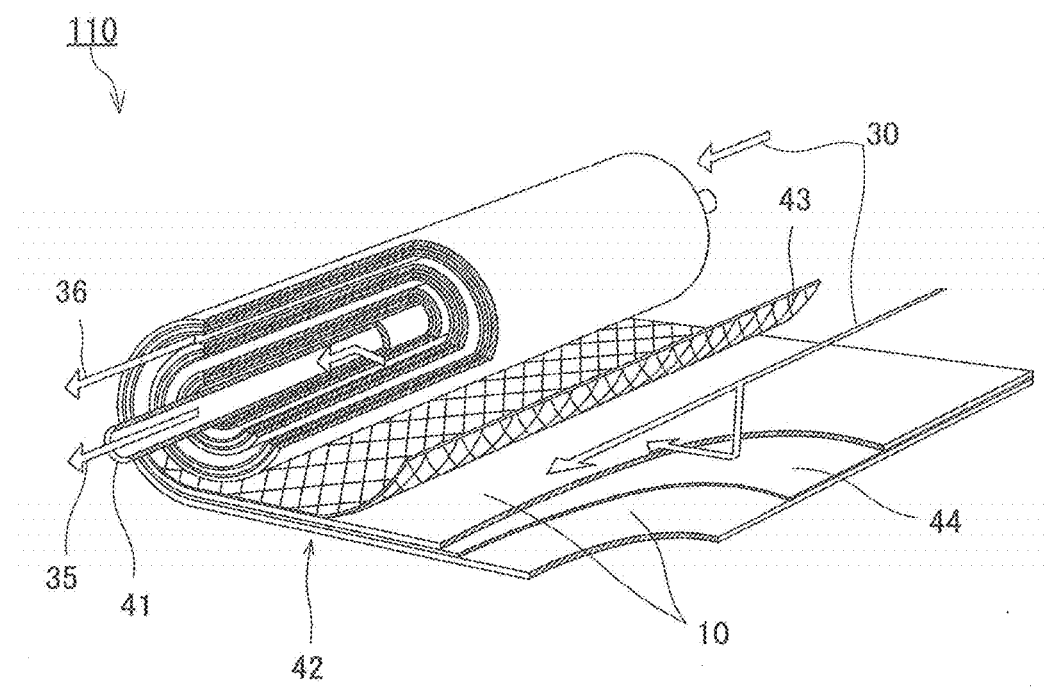
FIG. 3 is a perspective view schematically showing a modification of the membrane separation device including the separation membrane of the present invention.

As shown in FIG. 3, a membrane separation device 110 of the present embodiment includes a central tube 41 and a laminate 42. The laminate 42 includes the separation membrane 10. The membrane separation device 110 is a spiral membrane element.

The central tube 41 has a cylindrical shape. The central tube 41 has, in its surface, a plurality of holes for allowing the permeated fluid 35 to flow into the central tube 41. Examples of the material of the central tube 41 include: a resin such as an acrylonitrile-butadiene-styrene copolymer resin (ABS resin), a polyphenylene ether resin (PPE resin), and a polysulfone resin (PSF resin); and a metal such as stainless steel and titanium. The central tube 41 has an inner diameter in a range of 20 to 100 mm for example.

The laminate 42 further includes a supply-side flow passage material 43 and a permeation-side flow passage material 44 in addition to the separation membrane 10. The laminate 42 is wound around the central tube 41. The membrane separation device 110 may further include an exterior material (not shown).

For example, a resin net composed of polyphenylene sulfide (PPS) or an ethylene-chlorotrifluoroethylene copolymer (ECTFE) can be used as the supply-side flow passage material 43 and the permeation-side flow passage material 44.

Membrane separation using the membrane separation device 110 is performed by the following method, for example. First, the gas mixture 30 is supplied into one end of the wound laminate 42. The permeated fluid 35 that has permeated through the separation membrane 10 of the laminate 42 moves into the central tube 41. The permeated fluid 35 is discharged outside via the center tube 41. The gas mixture 30 processed by the membrane separation device 110 (concentrated fluid 36) is discharged outside from the other end of the wound laminate 42. Thus, the acid gas can be separated from the gas mixture 30.

EXAMPLES

Hereinafter, the present invention will be described in more detail by way of Examples and Comparative Examples, but the present invention is not limited to these examples.

Example 1

First, a coating liquid containing polyether block amide (PEBAX manufactured by Arkema Co., Ltd.) was prepared. Next, the coating liquid was applied to a transfer film made of polyethylene terephthalate (PET). Application of the coating liquid was performed by the spin coating method. The rotation speed of the spin coater was 500 rpm. Next, the obtained coating was heated at 60° C. for 30 minutes to be dried, and thus a separation functional layer is produced.

Next, a dispersion containing polydimethylsiloxane and a silica nanoparticle having a surface modified with a modifying group (AEROSIL R974 manufactured by Nippon Aerosil Co., Ltd.) was prepared. The silica nanoparticle had the surface in which $R^4$ and $R^5$ in the formula (3) were each a methyl group. The average particle diameter of the silica nanoparticles was 10 nm. The weight ratio of the polydimethylsiloxane to the silica nanoparticles in the dispersion was 6:1. Next, the dispersion was applied onto the separation functional layer. Application of the dispersion was performed by the spin coating method. The rotation speed of the spin coater was 1000 rpm. Next, the obtained coating was heated at 90° C. for 10 minutes to be dried, and thus an intermediate layer is produced. Next, a porous support member was attached to the intermediate layer by using a hand roller, and the transfer film was removed, thereby obtaining a separation membrane of Example 1. The used porous support member was polysulfone (PS).

Figure 4:
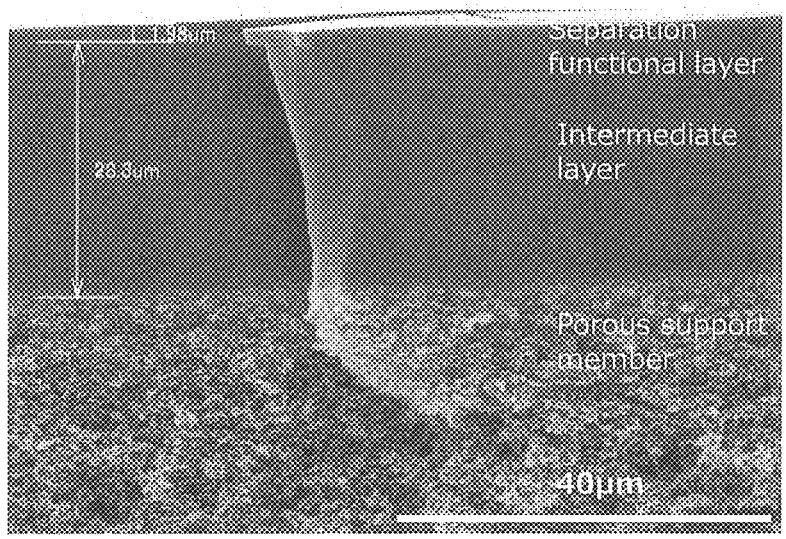
FIG. 4 is a scanning electron microscope (SEM) image of a cross section of a separation membrane of Example 1.

FIG. 4 shows a scanning electron microscope (SEM) image of a cross section of the separation membrane of Example 1. In the separation membrane of Example 1, the thickness of the separation functional layer was 1.98 μm, and the thickness of the intermediate layer was 28.3 μm.

Figure 7:
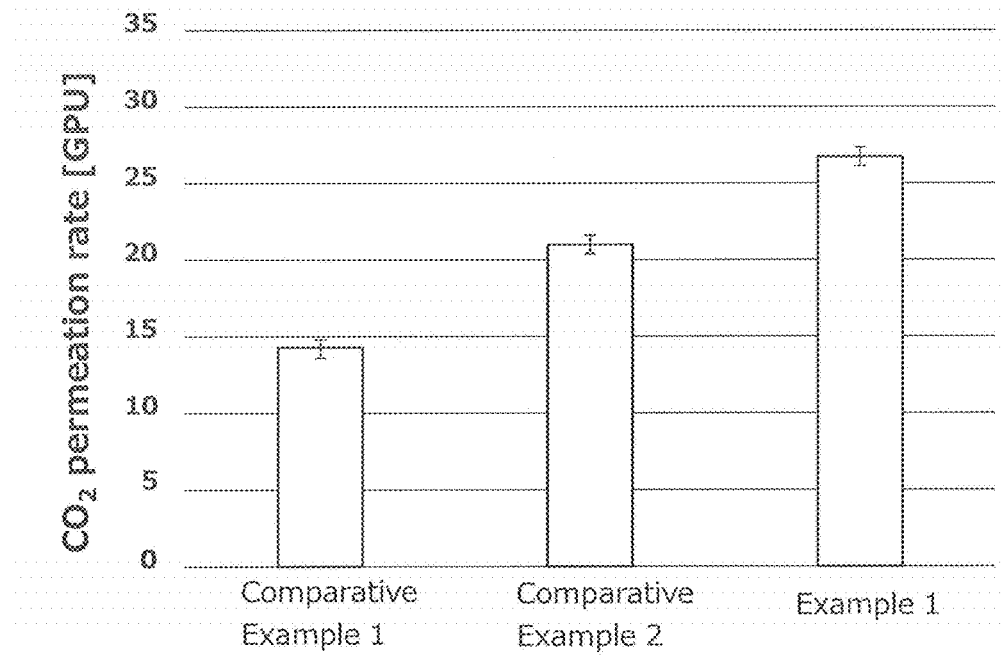
FIG. 7 is a graph showing carbon dioxide permeation rates through the separation membranes of Example 1, Comparative Example 1, and Comparative Example 2.
Figure 8:
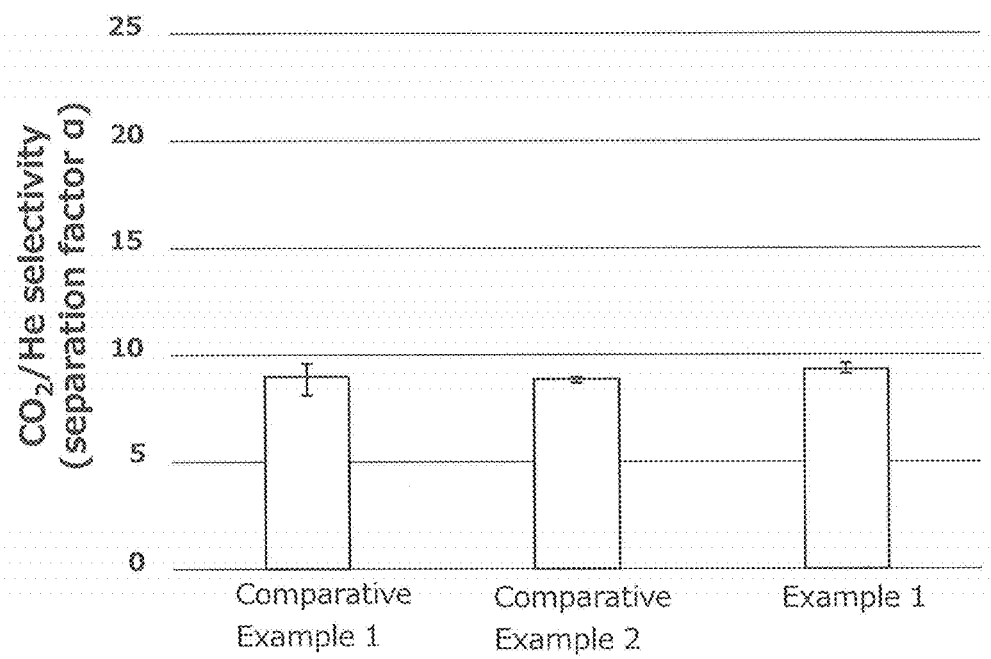
FIG. 8 is a graph showing separation factors α of the separation membranes of Example 1, Comparative Example 1, and Comparative Example 2 for carbon dioxide with respect to helium.

Next, a permeation rate T of carbon dioxide permeated through the separation membrane of Example 1 and a separation factor α of the separation membrane were measured by the following method. First, the separation membrane of Example 1 was set in a metal cell, and the metal cell was sealed with an O-ring such that no leakage occurred. Next, a gas mixture was injected into the metal cell such that the gas mixture was in contact with a main surface on the separation functional layer side of the separation membrane. The gas mixture was composed substantially of carbon dioxide and helium. The concentration of carbon dioxide in the gas mixture was 50 vol % under standard conditions. The temperature of the gas mixture injected into the metal cell was 30° C. The pressure of the gas mixture was 0.1 MPa. Accordingly, a gaseous permeated fluid was obtained from a main surface on the porous support member side of the separation membrane. Based on the composition of the obtained permeated fluid, the weight of the permeated fluid, and the like, the permeation rate T of carbon dioxide permeated through the separation membrane and the separation factor α of the separation membrane were calculated. The results are shown in FIGS. 7 and 8.

Comparative Example 1

Figure 5:
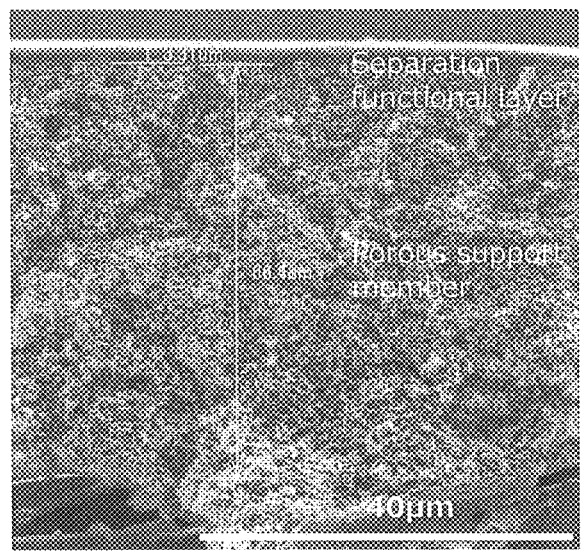
FIG. 5 is an SEM image of a cross section of a separation membrane of Comparative Example 1.

A separation membrane of Comparative Example 1 was produced by the same method as that of Example 1, except that no intermediate layer was produced. FIG. 5 shows an SEM image of a cross section of the separation membrane of Comparative Example 1. In the separation membrane of Comparative Example 1, the thickness of a separation functional layer was 3.31 μm. Furthermore, the characteristics of the separation membrane of Comparative Example 1 were evaluated by the same method as that of Example 1. The results are shown in FIGS. 7 and 8.

Comparative Example 2

Figure 6:
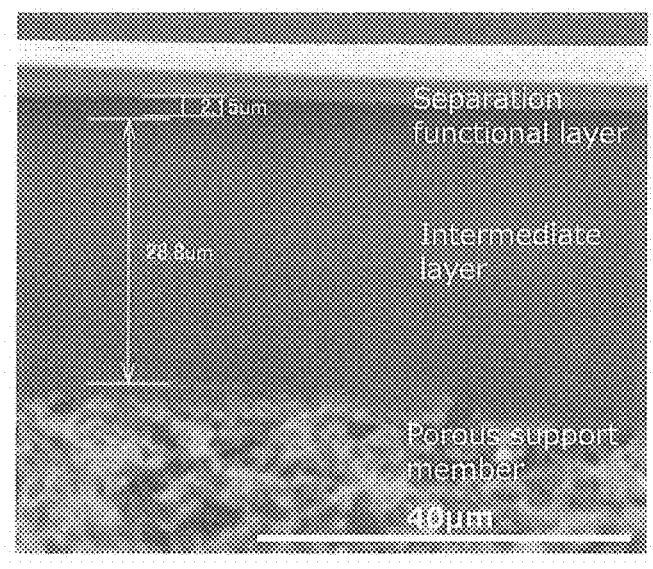
FIG. 6 is an SEM image of a cross section of a separation membrane of Comparative Example 2.

A separation membrane of Comparative Example 2 was produced by the same method as that of Example 1, except that no silica nanoparticles were added to a dispersion. FIG. 6 shows an SEM image of a cross section of the separation membrane of Comparative Example 2. In the separation membrane of Comparative Example 2, the thickness of a separation functional layer was 2.15 μm, and the thickness of an intermediate layer was 28.8 μm. In FIG. 6, although the range indicating the thickness of the separation functional layer is shifted from an appropriate position, there is no error in the thickness of the separation functional layer (2.15 μm) and the thickness of the intermediate layer (28.8 μm) themselves. Furthermore, the characteristics of the separation membrane of Comparative Example 2 were evaluated by the same method as that of Example 1. The results are shown in FIGS. 7 and 8.

As can be seen from FIGS. 7 and 8, the separation membrane of Example 1 including the intermediate layer including nanoparticles had a similar level of separation factor α and a high permeation rate T, compared with the separation membrane of Comparative Example 1 including no intermediate layer and the separation membrane of Comparative Example 2 including the intermediate layer including no nanoparticles. Specifically, the separation membrane of Example 1 had the separation factor α of 9.3 and the permeation rate T of 26.7 GPU. It could be assumed that, in the separation membrane of Comparative Example 1, the material of the separation functional layer entered pores of the porous support member, and accordingly the thickness of the separation functional layer was larger than that of Example 1.

Example 2

A separation membrane of Example 2 was produced by the same method as that of Example 1, except that a coating liquid containing a double-network gel was used instead of the coating liquid containing polyether block amide. The double-network gel included a first network structure composed of polydimethylacrylamide, a second network structure composed of silica particles (AEROSIL 200 manufactured by Nippon Aerosil Co., Ltd.), and an ionic liquid ([EMIM][DCA]). The content of the first network structure, the content of the second network structure, and the content of the ionic liquid in the double-network gel were respectively 15 wt %, 5 wt %, and 80 wt %.

Figure 9:
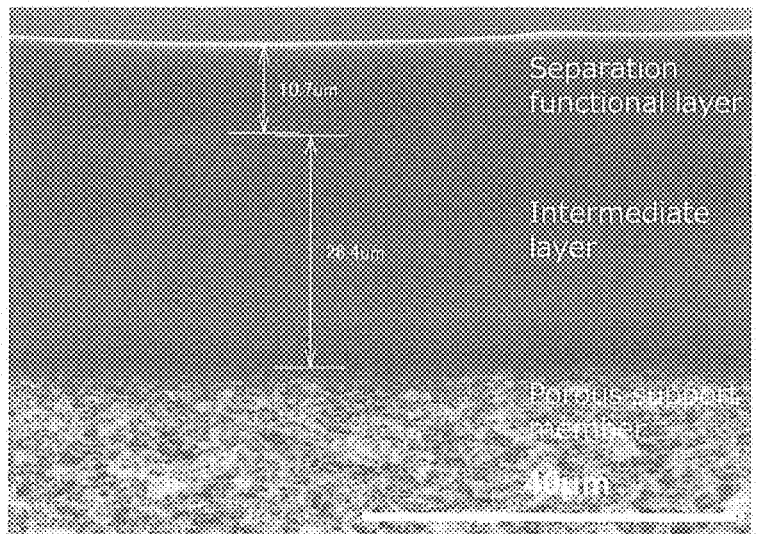
FIG. 9 is an SEM image of a cross section of a separation membrane of Example 2.
Figure 12:
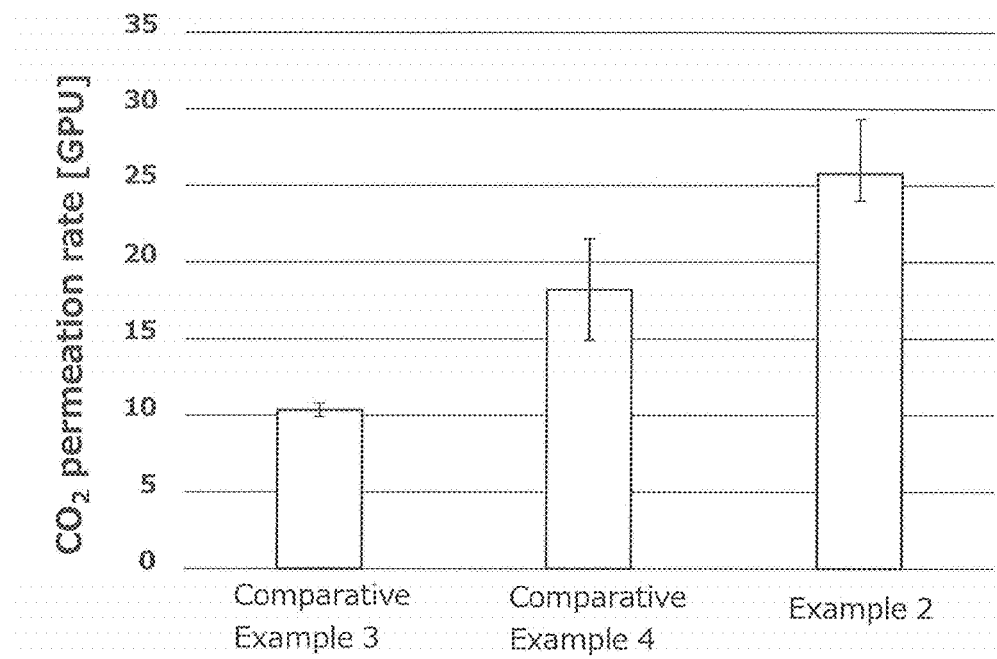
FIG. 12 is a graph showing carbon dioxide permeation rates through the separation membranes of Example 2, Comparative Example 3, and Comparative Example 4.
Figure 13:
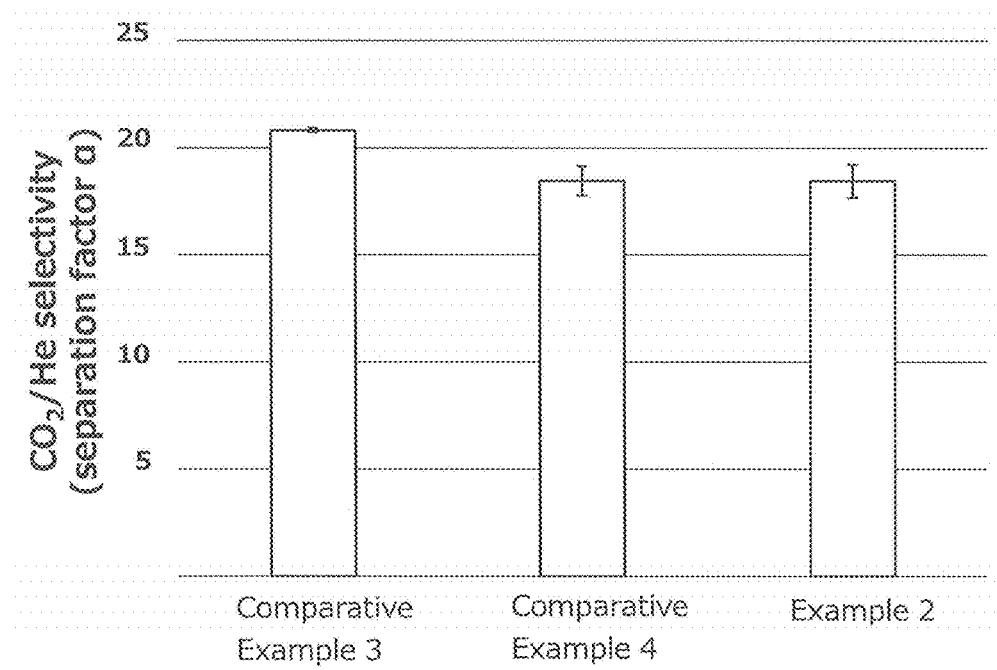
FIG. 13 is a graph showing separation factors α of the separation membranes of Example 2, Comparative Example 3, and Comparative Example 4 for carbon dioxide with respect to helium.

FIG. 9 shows an SEM image of a cross section of the separation membrane of Example 2. In the separation membrane of Example 2, the thickness of a separation functional layer was 10.7 μm, and the thickness of an intermediate layer was 28.4 μm. Furthermore, the characteristics of the separation membrane of Example 2 were evaluated by the same method as that of Example 1. The results are shown in FIGS. 12 and 13.

Comparative Example 3

Figure 10:
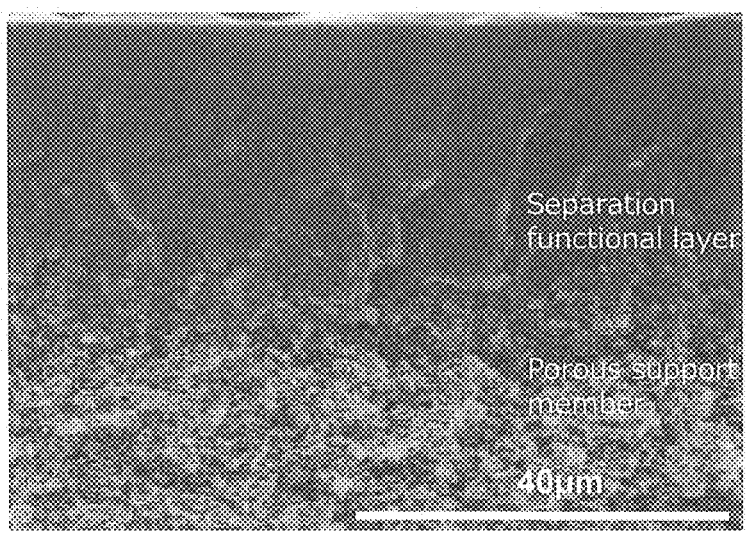
FIG. 10 is an SEM image of a cross section of a separation membrane of Comparative Example 3.

A separation membrane of Comparative Example 3 was produced by the same method as that of Example 2, except that no intermediate layer was produced. FIG. 10 shows an SEM image of a cross section of the separation membrane of Comparative Example 3. As can be seen from FIG. 10, in the separation membrane of Comparative Example 3, a large amount of material of the separation functional layer entered pores of the porous support member, and the boundary between the separation functional layer and the porous support member cannot be specified. Furthermore, the characteristics of the separation membrane of Comparative Example 3 were evaluated by the same method as that of Example 1. The results are shown in FIGS. 12 and 13.

Comparative Example 4

Figure 11:
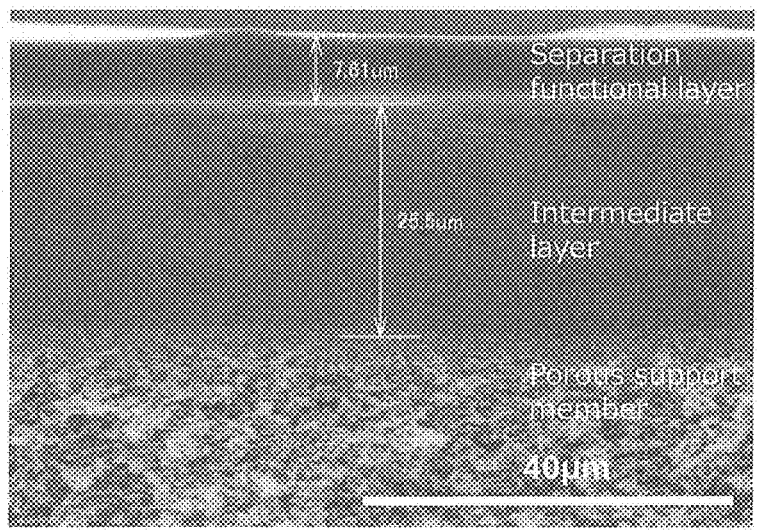
FIG. 11 is an SEM image of a cross section of a separation membrane of Comparative Example 4.

A separation membrane of Comparative Example 4 was produced by the same method as that of Example 2, except that no silica nanoparticles were added to a dispersion. FIG. 11 shows an SEM image of a cross section of the separation membrane of Comparative Example 4. In the separation membrane of Comparative Example 4, the thickness of a separation functional layer was 7.61 μm, and the thickness of an intermediate layer was 25.5 μm. Furthermore, the characteristics of the separation membrane of Comparative Example 4 were evaluated by the same method as that of Example 1. The results are shown in FIGS. 12 and 13.

As can be seen from FIGS. 12 and 13, the separation membrane of Example 2 including the intermediate layer including nanoparticles had a similar level of separation factor α and a high permeation rate T, compared with the separation membrane of Comparative Example 3 including no intermediate layer and the separation membrane of Comparative Example 4 including the intermediate layer including no nanoparticles. Specifically, the separation membrane of Example 2 had the separation factor α of 19 and the permeation rate T of 26 GPU. The separation membrane of Example 2 including the separation functional layer including the double-network gel had a high separation factor α, compared with the separation membrane of Example 1 including the separation functional layer including polyether block amide.

Example 3

First, a dispersion containing polydimethylsiloxane and a silica nanoparticle having a surface modified with a modifying group (AEROSIL R974 manufactured by Nippon Aerosil Co., Ltd.) was prepared. The silica nanoparticle had the surface in which $R^4$ and $R^5$ in formula (3) were each a methyl group. The average particle diameter of the silica nanoparticles was 10 nm. The weight ratio of the polydimethylsiloxane to the silica nanoparticles in the dispersion was 20:1. Next, the dispersion was applied onto a porous support member. The used porous support member was polysulfone (PS). Application of the dispersion was performed by a dip coating method. Next, the obtained coating was heated at 120° C. for two minutes to be dried, and thus an intermediate layer is produced.

Next, a coating liquid containing polyether block amide (PEBAX manufactured by Arkema Co., Ltd.) was prepared. This coating liquid was applied onto the intermediate layer. Application of the coating liquid was performed by the spin coating method. The rotation speed of the spin coater was 500 rpm. Next, the obtained coating was heated at 60° C. for 30 minutes to be dried, and thus a separation functional layer is produced. Thus, a separation membrane of Example 3 was obtained.

Figure 14:
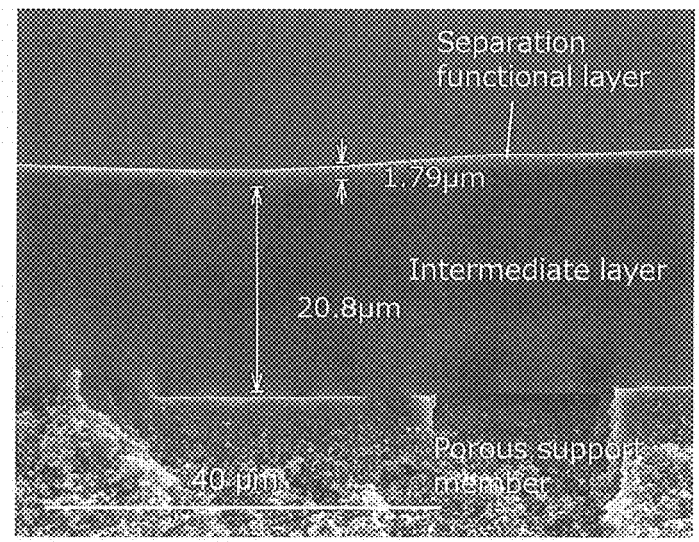
FIG. 14 is an SEM image of a cross section of a separation membrane of Example 3.

FIG. 14 shows an SEM image of a cross section of the separation membrane of Example 3. In the separation membrane of Example 3, the thickness of the separation functional layer was 1.79 μm, and the thickness of the intermediate layer was 20.8 μm. Furthermore, the characteristics of the separation membrane of Example 3 were evaluated by the same method as that Example 1.

Example 4

Figure 15:
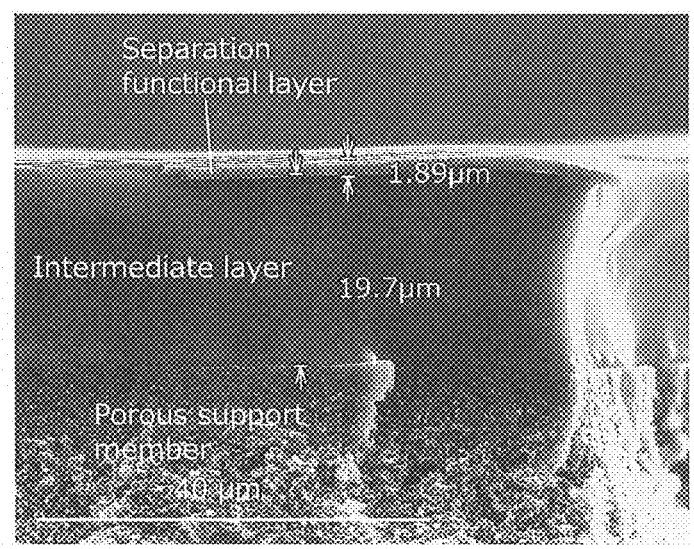
FIG. 15 is an SEM image of a cross section of a separation membrane of Example 4.

A separation membrane of Example 4 was obtained by the same method as that of Example 3, except that a silica nanoparticle having a surface represented by the above formula (5) were used as a nanoparticle. The average particle diameter of the silica nanoparticles used in Example 4 was 97 nm. FIG. 15 shows an SEM image of a cross section of the separation membrane of Example 4. In the separation membrane of Example 4, the thickness of the separation functional layer was 1.89 μm. Furthermore, the characteristics of the separation membrane of Example 4 were evaluated by the same method as that of Example 1.

TABLE 1

| Separation membrane | Intermediate layer | Membrane thickness of intermediate layer [μm] | $CO_2$ permeation rate [GPU] | $CO_2$/He selectivity [—] | Intermediate layer application method |
|---|---|---|---|---|---|
| Comparative Example 1 | None | 0 | 14.3 | 9.0 | Transfer |
| Comparative Example 2 | Only silicone (No nanoparticles) | 28.8 | 21.0 | 8.9 | Transfer |
| Example 1 | Silicone containing Aerosil R974 | 28.3 | 26.7 | 9.3 | Transfer |
| Example 3 | Silicone containing Aerosil R974 | 20.8 | 32.3 | 9.5 | Dip coating |
| Example 4 | Silicone containing surface-modified silica nanoparticles | 19.7 | 40.8 | 9.8 | Dip coating |

Comparison of Examples 3 and 4 shows that the silica nanoparticle having the surface represented by the formula (5) is suitable for increasing the permeation rate T of carbon dioxide.

INDUSTRIAL APPLICABILITY

The separation membrane of the present embodiment is suitable for separating an acid gas from a gas mixture containing the acid gas. In particular, the separation membrane of the present embodiment is suitable for separating carbon dioxide from an off-gas of a chemical plant or a thermal power plant.

The invention claimed is:

1. A separation membrane comprising:
   a separation functional layer;
   a porous support member supporting the separation functional layer; and
   an intermediate layer disposed between the separation functional layer and the porous support member, and including a matrix and nanoparticles dispersed in the matrix,
wherein
   the separation functional layer includes a polyether block amide resin or an ionic liquid,
   the intermediate layer has a thickness of 30 μm or less,
   the matrix includes a silicone resin,
   the nanoparticle has a spherical shape, and
   at least one of requirements (i) and (ii) below holds:
      (i) the nanoparticle has a surface modified with a modifying group including a carbon atom;
      (ii) the nanoparticle includes silica.

2. The separation membrane according to claim 1, wherein
   the modifying group further includes a silicon atom.

3. The separation membrane according to claim 1, wherein
   the modifying group includes an optionally substituted hydrocarbon group.

4. The separation membrane according to claim 3, wherein
   the hydrocarbon group is a linear or branched alkyl group having 1 to 8 carbon atoms.

5. The separation membrane according to claim 3, wherein
the optionally substituted hydrocarbon group is represented by formula (1) below:

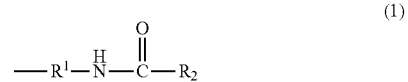

where $R^1$ is an optionally substituted alkylene group having 1 to 5 carbon atoms, and $R^2$ is an optionally substituted alkyl group or aryl group having 1 to 20 carbon atoms.

6. The separation membrane according to claim 1, wherein
   the separation functional layer has a double-network gel including the ionic liquid.

7. A separation membrane comprising:
   a separation functional layer; and
   a layer including a matrix and nanoparticles dispersed in the matrix, the layer having a thickness of less than 50 μm,
wherein
   the separation functional layer includes a polyether block amide resin or an ionic liquid,
   the matrix includes a silicone resin,
   the nanoparticle has a spherical shape, and
   at least one of requirements (i) and (ii) below holds:
      (i) the nanoparticle has a surface modified with a modifying group including a carbon atom;
      (ii) the nanoparticle includes silica.

8. A separation membrane comprising:
   a separation functional layer;
   a porous support member supporting the separation functional layer; and
   an intermediate layer disposed between the separation functional layer and the porous support member, and including a matrix and nanoparticles dispersed in the matrix,
wherein
   the separation functional layer includes a polyether block amide resin or an ionic liquid, and
   the nanoparticle has a spherical shape.

* * * * *